United States Patent [19]

Weaver

[11] Patent Number: 4,560,365
[45] Date of Patent: Dec. 24, 1985

[54] VEHICLE SPEED SENSOR

[75] Inventor: Frank C. Weaver, Chicago, Ill.

[73] Assignee: Stewart-Warner Corporation, Chicago, Ill.

[21] Appl. No.: 539,489

[22] Filed: Oct. 6, 1983

[51] Int. Cl.$^4$ .............................................. F16H 37/02
[52] U.S. Cl. ........................................... 464/52; 74/12
[58] Field of Search .......................... 464/52, 179, 182; 74/12

[56] References Cited

U.S. PATENT DOCUMENTS

| | | | |
|---|---|---|---|
| 1,806,541 | 5/1931 | Gustafson | 464/52 X |
| 2,793,532 | 5/1957 | Johnson et al. | 74/12 |
| 2,801,530 | 8/1957 | Holt | 464/52 |
| 3,610,056 | 3/1970 | Bartholomew | 464/52 X |
| 4,154,118 | 5/1979 | Hoetger et al. | 74/12 |

Primary Examiner—Stephen Marcus
Assistant Examiner—Leo James Peters
Attorney, Agent, or Firm—A. G. Douvas; D. V. Allen

[57] ABSTRACT

A speed sensor and cable assembly that connects to an opening in automobile transmission housings and includes a one-piece plastic molded ferrule and gear bearing for supporting the cable and a speed sensor gear in the housing opening. This ferrule has a plurality of spaced integral rigid rings that support the ferrule in the housing opening and it also has an integral shaft projecting in the housing for supporting the speed sensor gear.

8 Claims, 5 Drawing Figures

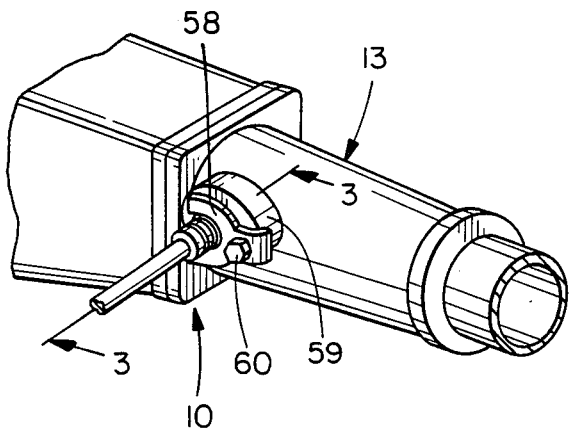
FIG.1
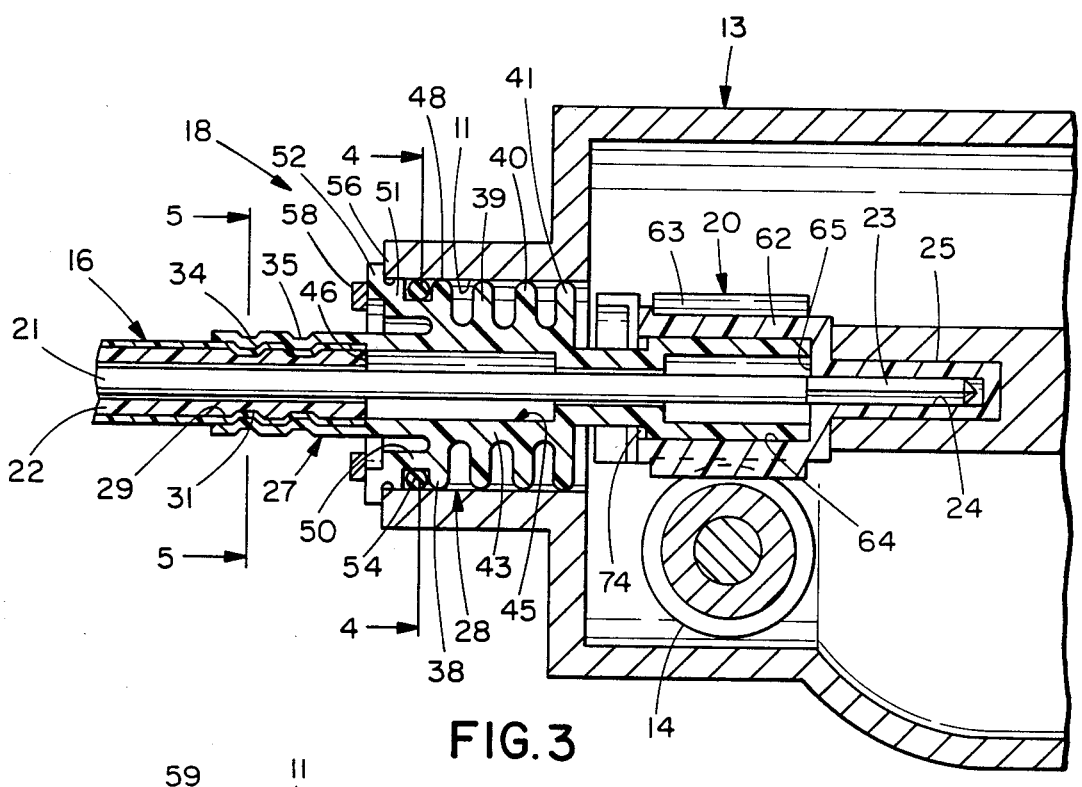
FIG.3
FIG.4
FIG.5

VEHICLE SPEED SENSOR

BACKGROUND OF THE INVENTION

Most U.S. automobile manufacturers have prepared specification manuals that include general requirements for the speedometer cable and speed sensor assembly that provides speed information to the speedometer, the odometer and also to other instrumentation requiring a speed signal such as onboard computers that provide visual indications of miles per gallon and time to destination. The speedometer cable includes a rotating flexible metal shaft covered by a nylon or polypropylene sheath or casing. This cable is drivingly connected to one of the available gears in the automobile transmission usually through a bore formed in an extension in the transmission's housing. The cable is connected to the housing using an enlarged cylindrical metal ferrule that fits closely in this housing bore and has an axial central passage that receives and grips the cable. The end of the cable projecting within the transmission housing, or more particularly the drive shaft which usually has a square configuration at the point where it projects from the case or sheathing, is attached to a sensing gear, sometimes a plastic molded pinion gear that interengages with a worm gear in the transmission. The transmission end of the speedometer cable is held in position in the housing by a clamping fork that holds a flange on the outside of the ferrule in its seated position against the transmission housing extension.

In the past, this mounting ferrule has been constructed of metal and while prior metal ferrules have been found satisfactory, the configuration of the ferrule and its size require several machining and forming operations that make the ferrule a significant contributor to the cost of the entire speedometer sensor and cable assembly. As may be appreciated, the competition to supply items such as speedometer cable assemblies to automobile manufacturers is extremely competitive, and thus the search for unique and ingenious ways to reduce the cost of such items without sacrificing the demands for high performance and reliability is indeed an intensive one.

One apparent way to reduce the cost of manufacturing and assembling the ferrule is to construct it of molded plastic, but thus far attempts at manufacturing plastic ferrules has not been satisfactory because of the rather severe enviroment to which the ferrule is subjected. Transmission temperatures frequently exceed several hundred degrees fahrenheit and this heat along with the heated transmission oil to which the ferrule is directly exposed because of its location in the housing, attack the plastic ferrule materials resulting in ferrule deformation that produces sensor gear misalignment as well as a weakening of the attachment of the ferrule to the cable casing.

One prior attempt to design a plastic ferrule includes a plurality of axially extending flexible relatively thin fins on the ferrule that are press fitted and deformed slightly during assembly into the transmission housing bore in an effort to minimize the alignment problems and at the same time provide a lower cost ferrule. However it has been found that these flexible axial fins or ribs distort under the severe conditions in the transmission housing causing a misalignment of the sensor gear connected end of the speedometer shaft which cannot be tolerated because excellent meshing engagement must be maintained between the sensor gear and the engaged transmission gear. And this is particularly critical in installations where the sensor gear is installations where the sensor gear is cantilevered in the transmission housing. A plastic ferrule of this type is shown and described in the Bartholomew U.S. Pat. No. 3,610,056.

It is the primary object of the present invention to ameliorate the problems noted above in speedometer cable assemblies.

SUMMARY OF THE PRESENT INVENTION

In accordance with the present invention an improved speedometer cable and sensor assembly is provided for vehicles that includes a one-piece molded plastic ferrule and sensor gear bearing and has performance and reliability equalling a metal ferrule at a fraction of its cost.

Toward these ends the present ferrule is constructed of a durable temperature and oil resistant plastic such as polybutylene and instead of being designed with an interference fit in the transmission housing bore it has an outer diameter slightly less than the bore on the order of 0.003 to 0.005 inches. The seating surfaces of the ferrule in the housing bore are defined by a plurality of axially spaced integral rigid annular discs or rings surrounding a reduced hollow central stem portion. The outer edges of these rings are curved to both facilitate insertion into the housing bore and to distribute transmission heat evenly across the ferrule. The rings themselves also assist in providing uniform heat distribution throughout the ferrule to reduce the possibility of deformation and the rigidity of these annular rings resists cable shaft misalignment. The transverse positioning of these discs or rings prevents any twisting of the ferrule within the housing bore.

The ferrule molding also has an integral forwardly extending hollow annular boss that forms a bearing for a plastic sensor worm gear. The sensor worm gear has a closed ended irregular bore that receives the projecting end of the cable drive shaft so that rotational motion is imparted from the sensor gear to the drive shaft. This sensor gear is retained on the ferrule boss by a metal U-shaped spring clip that fits through slots in the gear and engages a shoulder on one end of the integral bearing boss on the ferrule.

BRIEF DESCRIPTION OF THE DRAWINGS

FIG. 1 is a fragmentary perspective view of part of an automobile transmission with the transmission end of the speedometer cable and sensor assembly according to the present invention installed in the transmission's housing;

FIG. 3 is an enlarged fragmentary longitudinal section of the present speedometer cable and sensor gear assembly installed in a transmission, taken generally along line 3—3 of FIG. 1;

FIG. 4 is a cross-section taken generally along line 4—4 of FIG. 3; and

FIG. 5 is a cross-section taken generally along line 5—5 of FIG. 3 showing the ferrule connection to the speedometer cable.

DETAILED DESCRIPTION OF THE PREFERRED EMBODIMENT

Figure 2:
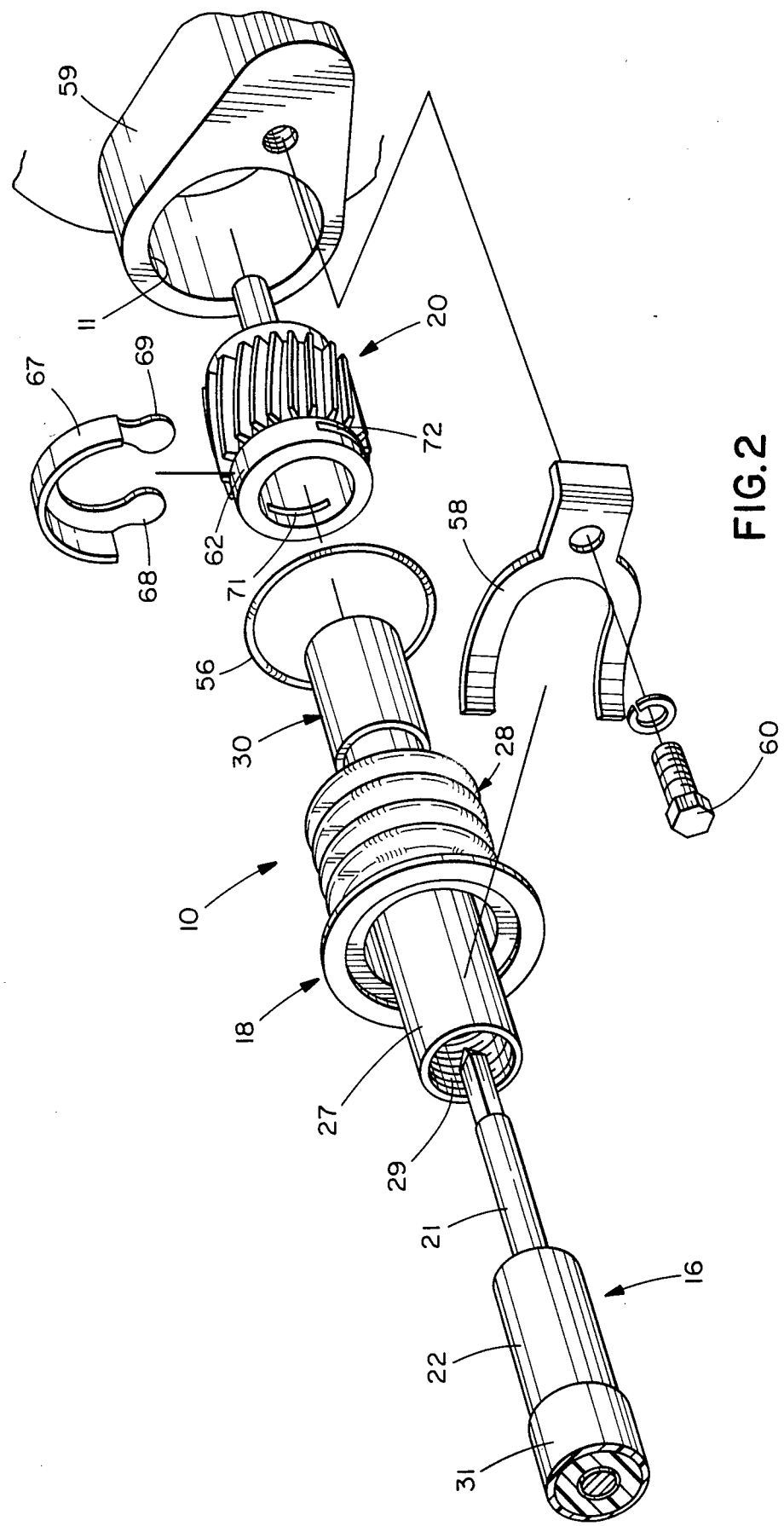
FIG. 2 is an enlarged exploded perspective view of the transmission end of the present speedometer cable and sensor assembly.

Referring to the drawings and particularly FIGS. 1 to 3, the present speedometer cable and sensor assembly 10 is illustrated shown mounted in a transmission housing bore 11 of an exemplary automobile transmission 13 shown only partly in the drawings. The speedometer cable and sensor assembly 10 is driven by a worm wheel 14 in the housing and provides a rotating shaft signal to drive the vehicle speedometer (not shown) in the passenger area as well as the odometer or any other instrument such as a miles per gallon calculator that requires a signal representing vehicle speed.

The cable and sensor assembly 10 generally includes a speedometer cable 16, a one-piece plastic molded ferrule and gear bearing 18 for supporting both the transmission end of the cable and a plastic sensor gear 20 drivingly connected to the cable 16 and driven by the worm wheel 14 in the transmission housing 13.

The speedometer cable 16 includes a flexible metal rotatable drive shaft 21 sheathed by a coated flexible tubular plastic casing 22 that may be constructed of nylon or polyproplylene with a similar plastic tubular outer layer 31. The drive shaft 21 has a rectangular end 23 that projects from the end of the casing 22 as shown clearly in FIGS. 2 and 3 and is nonrotatably received in a complementary rectangular closed ended bore 24 in a reduced central stem 25 projecting axially outwardly from sensor gear 20 so that rotational motion of the worm wheel 14 is imparted at a reduced speed to the drive shaft 21.

The ferrule and gear bearing molding 18 is constructed of a temperature and oil resistant plastic such as polybutylene or nylon in a one-piece molding, and the molding includes an enlarged tubular cable clamping portion 27, a seating portion 28 and an inwardly extending sensor gear bearing boss 30. The tubular cable receiving portion 27 has a course threaded internal bore 29 (see FIG. 2) and is heat staked and epoxied to the outer cable layer 31. Spaced annular depressions 34 and 35 in both the tubular portion 27 and the sheath layers 22 and 31 as seen clearly in FIG. 3 are formed by a similarly shaped heat staking tool and with the threaded bore 29 and the epoxy securely lock the molding 18 to the cable.

The mounting or seating portion 28 of support molding 18 includes four annular integral ring or disc like members 38, 39, 40 and 41 extending transversely around a stem portion 43 that has a stepped bore 45 therein that receives cable 16 with the end of the cable layer 22 abutting against a shoulder 46 in bore 45. The outer diameter of the disc members 38 to 41 is slightly less, on the order of 0.003 inches, than the diameter of housing bore 11. This facilitates assembly of the ferrule molding 18 into the housing bore 11 and negates any possible deformation of the ferrule caused by the varying temperature coefficients of the dissimilar materials in the assembly and the metal transmission housing.

The peripheral surfaces 48 of the disc members 38 to 41 are arcuate in longitudinal section illustrated in the plane of FIG. 3 and this contributes to the ease of insertion of the ferrule and gear molding 18 into the bore 11 and also helps to give an even distribution of heat throughout the ferrule to minimize part distortion and shaft misalignment.

The outermost disc 38 has an integral annular portion 50 extending axially rearwardly therefrom, and a annular radially extending portion 51 connected to a second annular outwardly extending portion 52 having an outer diameter greater than the diameter of bore 11. Annular portion 51 has an outer diameter equal to the outer diameter of the disc members 38 to 41 and is seated in the outer end of the housing bore 11 and it has an annular semitoroidal groove 54 therein that receives a sealing O-ring 56. The outermost annular portion 52 forms a seating surface for a bifurcated clamp 58 that is fastened to a housing extension 59 in which bore 11 is formed by a threaded bolt 60 as seen in FIGS. 1 and 2.

The sensor gear 20 is a one-piece plastic molding including an annular portion 62 having worm teeth 63 on the outer periphery thereof and a central enlarged bore 64 therein rotatably mounted on boss portion 30 in its assembled position. The end of boss portion 30 engages shoulder 65 at the inner end of gear bore 64 axially locating the gear 20 in one direction with respect to ferrule molding 18, and the gear is held onto the ferrule by a U-shaped spring clip 67 that has spaced ears 68 and 69 that snap through slots 71 and 72 in the outer end of the gear portion 62 as seen more clearly in FIG. 2, and these ears engage shoulder 74 on the outer end (the end toward housing bore 11) of boss 30 holding the gear 20 axially on the boss 30 while permitting free rotational movement of the gear on the boss.

I claim:

1. In an assembly for transmitting rotary motion from the gearing of a vehicle transmission to an indicating device with a housing access bore being provided in the transmission for receiving the assembly, the combination comprising; a one-piece rigid plastic ferrule mounted in the access bore and having an axially extending opening therethrough, a cable assembly connected to the ferrule including a drive shaft extending through the opening in the ferrule, and gear means drivingly connected to the drive shaft adapted to be driven by a gear in the transmission, said ferrule having at least three spaced integral annular rings transverse with respect to the drive shaft extending outwardly therefrom engaging the housing access bore to support the ferrule in the housing and align the drive shaft, said integral rings being rigid with substantially equal axial thickness and having a diameter slightly less than the diameter of the access bore to minimize ferrule distortion and eliminate drive shaft misalignment, said rings being sufficiently rigid and sized with respect to the housing bore so that they do not deform significantly at normal elevated transmission temperatures.

2. In an assembly for transmitting rotary motion from the gearing of a vehicle transmission to an indicating device with an access bore being provided in the transmission for receiving of the assembly, as defined in claim 1, wherein the rings have arcuate outer surfaces in longitudinal section in engagement with the housing bore to assist in distributing heat.

3. In an assembly for transmitting rotary motion from the gearing of a vehicle transmission to an indicating device with an access bore being provided in the transmission for receiving the assembly, as defined in claim 1, wherein the ferrule has an integral inwardly and axially extending boss, said gear means including a gear rotatably mounted on the gear means, said boss having a transverse shoulder, and fastener means connected to the gear and engaging said shoulder to hold the gear axially on the boss.

4. In an assembly for transmitting rotary motion from the gearing of a vehicle transmission to an indicating device with an access bore being provided in the transmission for receiving the assembly, as defined in claim 1, wherein the ferrule includes an annular flange at the outer end thereof having an outer diameter greater than the housing bore to axially position the ferrule with respect to the housing bore.

5. In an assembly for transmitting rotary motion from the gearing of a vehicle transmission to an indicating device with a housing access bore being provided in the transmission for receiving the assembly, the combination comprising; a one-piece rigid plastic ferrule mounted in the access bore and having an axially extending opening therethrough, said plastic ferrule having at least three rigid and spaced integral annular support projections to engage and support the ferrule in the access bore, said integral annular support projections being rigid with substantially equal axial thickness and having a diameter slightly less than the access bore, said support projections being sufficiently rigid and sized with respect to the housing bore so that they do not deform significantly at normal elevated transmission temperatures, a cable assembly connected to the ferrule and having a drive shaft therein, said ferrule having an integral inwardly axial boss having an axial opening therethrough receiving the drive shaft, and a gear rotatably mounted on said boss and drivingly connected to the drive shaft.

6. In an assembly for transmitting rotary motion from the gearing of a vehicle transmission to an indicating device with an access bore being provided in the transmission for receiving the assembly as defined in claim 5, wherein said ferrule projections are a plurality of transversely disposed integral annular rings extending outwardly engaging the access bore to support the ferrule in the transmission and align the drive shaft.

7. In an assembly for transmitting rotary motion from the gearing of a vehicle transmission to an indicating device with an access bore being provided in the transmission for receiving the assembly as defined in claim 5, wherein said boss has a transverse shoulder adjacent the outer end of the gear, said gear having a stepped bore therethrough with an enlarged portion and rotatably mounted on the boss and a reduced portion that nonrotatably receives the drive shaft, and a clip extending through a recess in the gear and engaging the boss shoulder to hold the gear on the boss.

8. In an assembly for transmitting rotary motion from the gearing of a vehicle transmission to an indicating device with a housing access bore being provided in the transmission for receiving the assembly comprising; a one-piece rigid plastic ferrule mounted in the access bore and having an axially extending opening therethrough, a cable assembly connected to the ferrule including a drive shaft extending through the opening in the ferrule, said ferrule having an integral inwardly extending axial boss having an axial opening therethrough receiving the drive shaft, a gear rotatably mounted on said boss and drivingly connected to the drive shaft, said boss having a transverse shoulder adjacent the outer end of the gear, said gear having a stepped bore therethrough with an enlarged portion rotatably mounted on the boss and a reduced portion that non-rotatably receives the drive shaft, and a clip extending through recesses in the gear and engaging the boss shoulder to hold the gear on the boss, said ferrule having a plurality of integral annular rings transverse with respect to the drive shaft extending outwardly therefrom engaging the access bore to support the ferrule in the housing and align the drive shaft, said integral rings being rigid with substantially equal axial thickness and having a diameter slightly less than the diameter of the access bore to minimize ferrule distortion and eliminate drive shaft misalignment, said rings being sufficiently rigid and sized with respect to the housing bore so that they do not deform significantly at normal elevated transmission temperatures.

* * * * *